United States Patent

[11] 3,547,156

[72] Inventor David A. Cockeram
Beeston, Leeds, England

[21] Appl. No. 830,959
[22] Filed June 6, 1969
[45] Patented Dec. 15, 1970
[73] Assignee Towler Hydraulics Limited
Rodley, Leeds, England
a British company
[32] Priority June 14, 1968
[33] Great Britain
[31] No. 28494/68

[54] FLUID CONTROL AMPLIFIERS
2 Claims, 5 Drawing Figs.

[52] U.S. Cl. .......... 137/625.25; 235/201; 251/31
[51] Int. Cl. .......... F16k 1/04
[50] Field of Search .......... 137/625.25, 625.27, 599, 625.48, 625.67; 251/118; 235/201

[56] References Cited

UNITED STATES PATENTS

| | | | |
|---|---|---|---|
| 3,070,295 | 12/1962 | Glattli | 235/201UX |
| 3,122,313 | 2/1964 | Glattli | 235/201(ME) |
| 3,242,946 | 3/1966 | Chabrier et al. | 235/201X |
| 3,303,999 | 2/1967 | Mamy | 235/201 |
| 3,311,301 | 3/1967 | Chabrier et al. | 235/201 |
| 3,433,257 | 3/1969 | Jensen | 137/599X |

*Primary Examiner*—M. Cary Nelson
*Assistant Examiner*—Robert J. Miller
*Attorney*—Wolfe, Hubbard, Leydig, Voit & Osann

ABSTRACT: A fluid control amplifier capable of performing NOR, OR, AND and NAND logic functions. A single movable switching member is used to switch an output signal on or off by seating against sealing lands located one on each side of the switching member, the switching member being movable upon the application of fluid pressures to actuating members on opposite sides of the switching member.

INVENTOR
DAVID A. COCKERAM by: Wolfe, Hubbard, Voit & Osann
ATTYS.

FLUID CONTROL AMPLIFIERS

The present invention relates to a fluid control amplifier, and in particular with an amplifier having logic capabilities, such that by the use of a fluid medium certain formal logic functions can be translated into corresponding switching modes.

Large and expensive interface devices are usually required for the conversion of output signals from low-powered electrical relay or electronic logic computation systems to input signals sufficiently powerful to control pneumatic or hydraulic power control valves. Fluid control amplifiers capable of performing logic functions are known but suffer from the defect of low-powered output signals or are themselves very power consuming.

According to the present invention a fluid control amplifier capable of performing NOR, OR, AND and NAND logic functions comprises a body having a main passageway therein closed at each end, the cross-sectional area of the passageway being variable along its length whereby to form interconnected chambers within the body, a valve element disposed in one of the chambers and movable between opposite shoulders formed by the junction of the chamber and the passageway, slidable elements disposed in and engaging the walls of chambers arranged on both sides of the valve element, the elements on one side being greater cross-sectional area than the element or elements on the other side, means in the passageway linking the valve element with the slidable elements, each linking means being in engagement with the wall of the passageway over a portion of its length adjacent a slidable element and branch passageways connecting the chambers containing the valve element, slidable elements and linking means with the exterior of the body.

The amplifier can perform the four basic formal logic functions of NOR, OR, AND and NAND by the use of various combinations of the branch passageways. The movable valve element switches an output signal on or off by seating in sealing engagement against one or other of the shoulders located one on each side of the element. The other slidable elements apply forces to the valve element. The amplifier embodies high input impedance with low output impedance, thus giving a high fan-out factor and when the demand is zero it has an extremely low power consumption in all modes of operation.

The invention will be described, by way of example, with reference to the accompanying drawings, in which.

Figures 1, 2, 3, 4, 5:
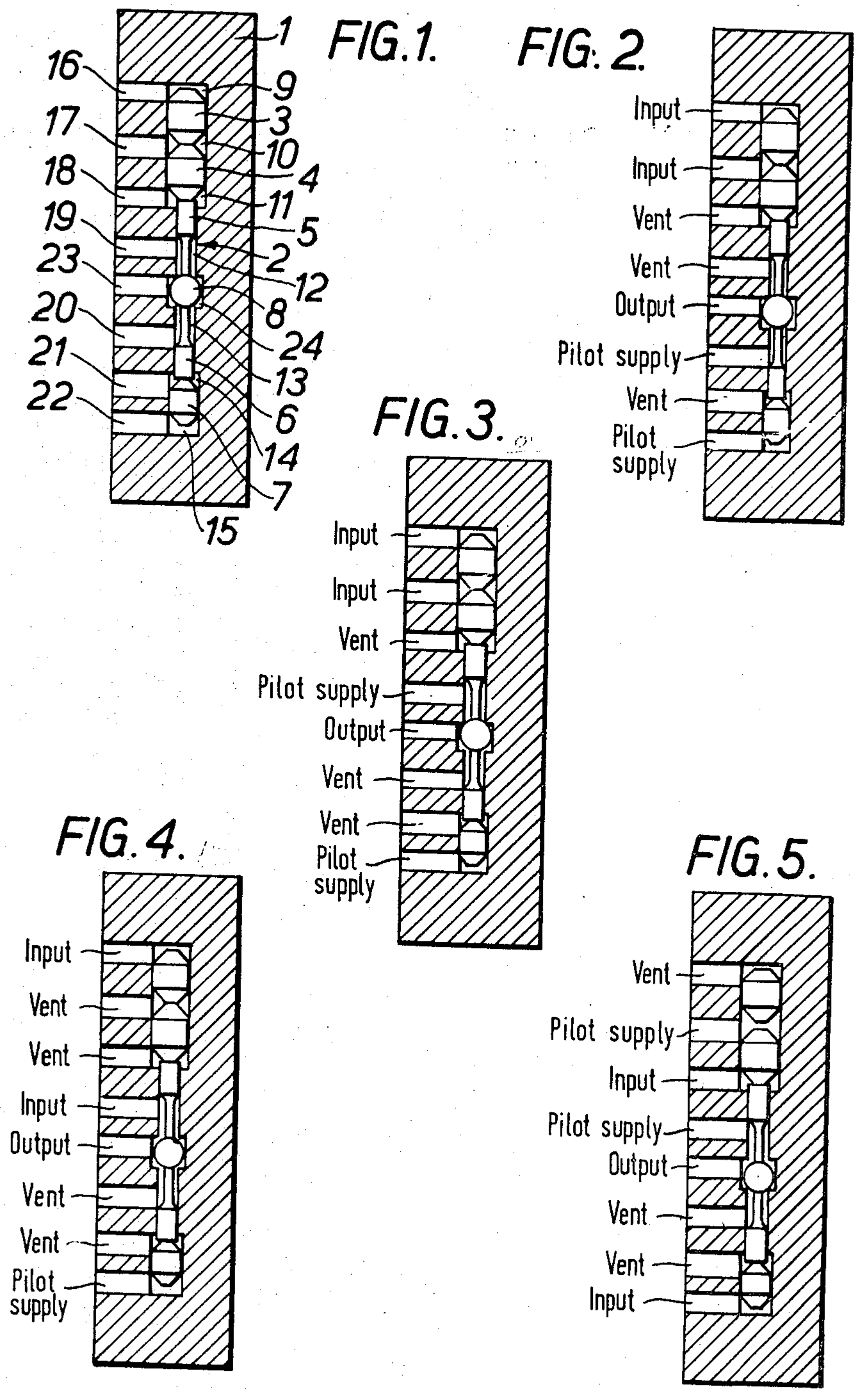
FIG. 1 is a diagrammatic representation of a fluid control amplifier.
FIGS. 2, 3, 4 and 5 illustrate respectively NOR, OR, AND an NAND embodiments.

A fluid amplifier, as shown in FIG. 1, comprises a body 1 having passageway 2, the diameter of which varies along its length. Free sliding cylindrical elements 3, 4, 5, 6 and 7 and a ball element 8 are located within the passageway. In this manner the passageway is divided into seven isolated chambers 9 to 15 between the elements. Each of these chambers has a passageway 16 to 22 respectively radiating from it, these communicating with various external connections to the device. Further, passageway 23 is located at the centre of that part of the main passageway 2 which contains the ball element 8. This passageway 23 forms an output connection for each application of the amplifier from which fluid pressure and flow is received whenever the amplifier is in an 'on' state.

The basic switching part of the amplifier is the ball element 8 located within chamber 24. Switching is achieved by urging ball 8 against one or the other of the shoulders formed at opposite ends of the chamber 24 at the junction with chambers 12 and 13. The ball 8 in its end positions effectively seals chamber 24 from chamber 12 and chamber 13 respectively.

Ball 8 is actuated by the action of any unbalanced forces resulting from pressure signals on the cylindrical elements, 3, 4 and 7. The small elements 5 and 6, one on each side of ball 8, serve to transmit these forces to the ball and to seal off any pressure in the part of the main passageway 2 containing the ball from the chambers 11 and 14. Elements 3 and 4 have greater cross-sectional areas than element 7 and hence amplification between an input signal pressure and a supply flow pressure can be achieved. This amplification is adjustable, being dependent upon the relative areas of these elements. The operation of the amplifier is described with reference to FIGS. 2 to 5 which depict respectively NOR, OR, AND and NAND modes in an unswitched state.

The NOR amplifier (FIG. 2) has passageways 20 and 22 connected to a constant pressure supply and passageways 18, 19 and 21 connected to a zero pressure source. Passageway 23 is the output from the amplifier and communicates with the constant pressure supply applied to passageway 20 as ball 8 is held against the shoulder formed by chamber 12 due to the action of the constant pressure upon element 7 in the inoperative state shown. Passageways 16 and 17 being independent input connections, a pressure signal at either will overcome the force due to the constant supply pressure acting on element 7 and switch the ball against the shoulder formed by chamber 13. Hence, the transmission of fluid pressure and flow from passageway 20 to passageway 23 is obstructed, whilst passageway 23 is opened to passageway 19 allowing the fluid in passageway 23 to exhaust to zero pressure.

The removal of the pressure signal from the input connection will subject ball 8 to an unbalanced force in the opposite direction due to the pressure on element 7 causing it to switch back to its original position, whereupon a is obtained again at the output passageway 23. The condition for an output signal is given by the following relationship (taking into account the strength of the signal required) where $^{P}I$ refers to the input signal pressure (suffix 16 and 17 respectively denoting pressure at passageways 16 and 17) A3 is the cross-sectional area of element 3, A4 the cross-sectional area of element 4, Pcps is the pressure of the constant pressure source and A7 is the cross-sectional area of element 7.

$$P_{01}=(P_{1_{16}}\,x\,A_3>P_{cps.}\,x\,A_7)\,V(P_{1_{17}}\,x\,A_4>P_{cps.}\,x\,A_7)$$

The OR amplifier (FIG. 3) has passageways 19 and 22 connected to a constant pressure supply and passageways 18, 20 and 21 to a zero pressure source. Passageway 23 is again the output connection, but in the unswitched state is open to passageway 20 and hence the fluid therein is at zero pressure. Ball 8 is held against the shoulder formed by chamber 12 and seals off the constant pressure supply in chamber 12. However, a pressure signal at either of the independent input connections (passageways 16 and 17) will overcome this force and switch ball 8 against the other shoulder formed by chamber 13. The constant pressure supply in passageway 19 is now directly connected to passageway 23 and hence an output signal is present. Upon the removal of the input signal the pressure acting on element 7 returns ball 8 to its unswitched position and passageway 23 is again open to passageway 20 and the zero pressure source, thus allowing the output signal to exhaust back to zero. The relationship covering the condition for an output from this amplifier is given by:

$$P_{01}=(P_{1_{16}}\,x\,A_3>P_{cps.}\,x\,A_7)\vee(P_{1_{17}}\,x\,A_4>P_{cps.}\,x\,A_7)$$

The AND amplifier (FIG. 4) has passageway 22 connected to a constant pressure source and passageways 17, 18, 20 and 21 to a zero pressure source. Passageway 23, being the output from the amplifier, is connected to passageway 20 and hence the fluid contained therein is at zero pressure whilst the constant pressure supply in passageway 22 acts on element 7 holding ball 8 against the shoulder formed by chamber 12. Thus, in the unswitched state there is no signal present at the output (passageway 23). A pressure signal in passageway 16 will overcome the force on element 7 and hence move ball 8 against the shoulder formed by chamber 13. However, no output signal will be given at passageway 23 as there is no supply available Also whilst in the unswitched state a pressure signal in passageway 19 will be prevented from being transmitted to the output of passageway 23 by ball 8 which is held against the shoulder formed by chamber 12. The force of this pressure signal on the seated area of ball 8 is not sufficient to overcome the opposing force resulting from the pressure applied in passageway 22 onto element 7. Once again no output signal is given at passageway 23. However, if a pressure signal is fed to passageway 16 and passageway 19 simultaneously, then ball 8 is not only switched to the shoulder formed by chamber 13 but the shoulder formed by chamber 13 but the input signal in passageway 19 is fed to passageway 23, and hence an output signal is given. The removal of either input signal or both will switch off the output signal. In the case of passageway 16 this will occur because the force overcoming that acting on element 7 is removed and hence ball 8 will switch back to the shoulder formed by chamber 12, cutting off passageway 19 from the passageway 23 which in turn is opened to passageway 20, thus allowing the fluid in that passageway to exhaust to zero pressure. On the removal of pressure at passageway 19, ball 8 will remain in the switched position (if pressure still exists at passageway 16 but no fluid signal will be available on an output signal), and as the removal of pressure at the passageway 19 must incorporate the exhausting of that fluid signal, the fluid in the output passageway 23 can also exhaust via passageway 19. The relationship covering the condition for an output signal is given by:

$$P_{01}=(P1_{16}\,x\,A_3>P_{cps.}\,x\,A_7).(P1_{19})$$

The NAND amplifier (FIG. 5) has passageways 17 and 19 connected to a constant pressure supply, and passageway 16, 20 and 21 to a zero pressure source.

Passageway 23 is the output and passageways 18 and 22 are the two independent input connections. In the unswitched state the constant pressure supply in passageway 17 acts on element 4 forcing ball 8 against he shoulder formed by chamber 13. Thus, the constant pressure supply in passageway 19 is connected to passageway 23 and hence an output signal is present from the amplifier. The force resulting from the constant pressure in passageway 19 acting on element 5 is less than the opposing force on element 4. If a pressure signal is applied to passageway 18 then the forces acting on elements 4 and 5 are balanced, but ball 8 will remain the unswitched position because of the pressure in chamber 24 acting on its seated area. If a pressure signal is applied to passageway 22, the force due to this pressure acting on element 7 will not be sufficient to overcome the force due to the constant pressure acting on element 4. Hence, ball 8 will remain in the unswitched position. However, if a pressure signal is fed to passageways 18 and 22 simultaneously then the forces acting on elements 4 and 5 are balanced, leaving only the force due to pressure in chamber 24 acting on the seated area of ball 8, which is overcome by the force due to the pressure signal acting on element 7. Consequently, ball 8 is switched to the other shoulder formed by chamber 12, thus obstructing the free passage of fluid from passageway 23 and opening passageway 23 to passageway 20 allowing the fluid in passageway 23 to exhaust to zero pressure In this way the output signal from the amplifier is switched off. Should the pressure signal to passageway 18 be removed, then the force on element 4 is no longer balanced and because this unbalanced force overcomes the force due the pressure signal on element 7, ball 8 returns to the other shoulder and back into the unswitched state, thereby switching the output signal back on. If in the switched state the pressure signal to passageway 22 is removed, the force due to the constant pressure in passageway 19 acting on the seated area of ball 8 is no longer resisted and thus ball 8 will be switched to the other shoulder, again switching on the output signal. Should both these pressure signals be removed then both of the forementioned conditions will occur and again ball 8 will return to its unswitched position, switching on the output signal again. The relationship covering the conditions for an output signal is given by:

$$P_{01}=(P1_{18}\,x\,A_4>P_{cps.}\,x\,A_4).(P1_{22}\,x\,A_7)>(P_{cps.}\,x\,A_5.P1_{18}\,x\,A_5)$$

A 8 is the seated area of ball 8.

A number of the amplifiers which are capable of carrying out the above four basic logic functions can be interconnected to perform many useful functions such as memory (or flip-flop), binary counters and half and full adders.

The device described herein is not limited to the illustrated examples. Among the possible variations are mechanical inputs through either of the blocked ends and dimensions of the elements can be varied to accommodate different throughputs of fluid and pressure levels. The relative dimensions of the elements and that part of the main passageway in which they are located can be varied to accommodate different amplifications of the input pressure signals.

I claim:

1. A fluid control amplifier capable of performing NOR, OR, AND and NAND logic functions comprising a body having a main passageway therein closed at each end, the cross-sectional area of the passageway being variable along its length whereby to form interconnected chambers within the body, a valve element disposed in one of the chambers and movable between opposite shoulders formed by the junction of the chamber and the passageway, slidable elements disposed in and engaging the walls of chambers arranged on both sides of the valve element, the slidable elements on one side of the valve element being a greater cross-sectional area than the elements on the other side, means in the passageway linking the valve element with the slidable elements, each linking means being in engagement with the wall of the passageway over a portion of its length adjacent a slideable element and branch passageways connecting the chambers containing the valve element, slidable elements and linking means with the exterior of the body.

2. A fluid control amplifier capable of performing NOR, OR, AND and NAND logic functions comprising a body; first, second, third and fourth coaxial cylindrical chambers in said body interconnected by a reduced diameter bore, the cross-sectional area of the first and second chambers being greater than the cross-sectional area of the fourth chamber, a valve element in the third chamber movable between the ends thereof, a piston slidable in each of said first, second and fourth chambers, linking members in the reduced diameter bore providing a rigid coupling between said pistons and valve element, the linking members linking the valve element to the respective pistons in the second and fourth chambers being in engagement with the wall of the reduced diameter bore over a portion of their lengths adjacent the respective pistons, and fluid passageways providing communication between the exterior of the body and the ends of said first, second and fourth chambers; the third chamber and the reduced diameter bore on each side of the third chamber whereby upon a prearranged distribution of input fluid pressure signals and constant fluid pressure signals to said passageways communicating with the first, second and fourth chambers and the reduced diameter bore a change in an output signal is derived from the passageway communicating with the third chamber containing the valve element.